United States Patent [19] [11] 3,948,856
Stackman [45] Apr. 6, 1976

[54] ACID INTERCHANGE POLYMERIZATION PROCESS FOR PRODUCING AN AROMATIC POLYESTER

[75] Inventor: Robert W. Stackman, Morris, N.J.

[73] Assignee: Celanese Corporation, New York, N.Y.

[22] Filed: Nov. 27, 1974

[21] Appl. No.: 527,613

Related U.S. Application Data

[63] Continuation-in-part of Ser. No. 401,081, Sept. 26, 1973, abandoned.

[52] U.S. Cl............. 260/47 C; 260/46.5 R; 260/49
[51] Int. Cl.² ................. C08G 63/04; C08G 63/10; C08G 63/30
[58] Field of Search.. 260/47 C, 61, 30.8 R, 33.2 R, 260/49, 46.8 R

[56] References Cited
UNITED STATES PATENTS

| | | | |
|---|---|---|---|
| 3,234,167 | 2/1966 | Sweeney | 260/30.4 |
| 3,317,464 | 5/1967 | Conix | 260/47 |
| 3,449,295 | 6/1969 | Conix | 260/47 |
| 3,704,279 | 11/1972 | Ismail | 260/61 |
| 3,824,213 | 7/1974 | Stackmann | 260/47 C |

Primary Examiner—Lester L. Lee

[57] ABSTRACT

An improved acid interchange polymerization process for the formation of an aromatic polyester is provided. Ester and carboxylic acid functional groups are reacted in the presence of a catalytically effective amount of a catalyst consisting of a mixture of a transition metal salt of a strong inorganic acid and a transition metal salt of an aliphatic carboxylic acid containing up to about 4 carbon atoms. In a preferred embodiment of the process the reactants are at least one aromatic diester and at least one aromatic dicarboxylic acid. Alternatively, the ester and carboxylic acid functional groups required for the acid interchange reaction may be provided upon the same molecule. Halogen or other substituent groups which do not interfere with the acid interchange reaction optionally may be present upon the aromatic rings.

22 Claims, No Drawings

ACID INTERCHANGE POLYMERIZATION PROCESS FOR PRODUCING AN AROMATIC POLYESTER

CROSS-REFERENCE TO RELATED APPLICATION

This is a continuation-in-part of my U.S. Ser. No. 401,081, filed Sept. 26, 1973, entitled "Acid Interchange Reaction for Forming Halogenated Aromatic Polyesters" (now abandoned).

BACKGROUND OF THE INVENTION

Both halogenated and non-halogenated aromatic polyester polymers have been known in the prior art, and generally exhibit good heat and light stability properties.

Heretofore aromatic polyesters generally have been formed in a one-step reaction in which a bisphenol, and an aromatic diacid halide (the latter usually is necessary since the aromatic diacid normally does not react) are reacted in the presence of a catalyst by interfacial or solution polymerization techniques. See, for example, U.S. Pat. No. 3,234,167. Such procedures, however, are disadvantageous since the aromatic diacid halide is a relatively expensive reactant.

As shown in U.S. Pat. No. 2,595,343, it is known to first react an aromatic bisphenol with acetic anhydride to form the bisphenol diacetate and then to condense the bisphenol diacetate with an aliphatic carboxylic acid to thus form a polyester by an acid interchange reaction. The condensation reaction is performed in the presence of an acid catalyst such as para-toluenesulfonic acid, phosphoric acid or sulfuric acid. Unfortunately such an acid interchange reaction does not yield acceptable products when an aromatic dicarboxylic acid is substituted as a reactant for the aliphatic acid. In particular, it has been found that when the acid interchange reaction of the type disclosed in the aforesaid U.S. Pat. No. 2,595,343, is conducted with a halogenated aromatic bisphenol diacetate and aromatic dicarboxylic acid reactants, the products are often discolored and of a low (i.e. below about 0.2) inherent viscosity (I.V., measured at 25°C. in a solution of 70–30 by weight mixture of phenol and trichlorophenol).

The search has thus continued for a suitable process for the production of an aromatic polyester which process is relatively inexpensive and which produces commercially acceptable, light-colored polyesters suitable for forming into shaped articles such as fibers, filaments, films and the like, by solvent-forming techniques. As understood by those skilled in the art, suitable fully aromatic polyesters must have an inherent viscosity of at least about 0.2 for such forming processes.

An advantageous and improved process for the production of a halogenated aromatic polyester is disclosed in commonly assigned U.S. Pat. No. 3,824,213. As more fully disclosed therein, an aliphatic carboxylic acid ester of a bisphenol having the recurring structural formula:

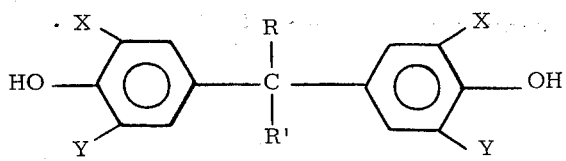

wherein X is chlorine or bromine and Y is hydrogen, chlorine or bromine with the provision that when X is chlorine, Y is hydrogen or chlorine and when X is bromine, Y is hydrogen or bromine, R and R' may be the same or different and represent lower alkyl groups or may, together, constitute a cyclic hydrocarbon group; is reacted in solution with an aromatic acid mixture of about 10 to about 60 percent of terephthalic acid and, correspondingly, from about 90 to 40 percent of isophthalic acid at a temperature of from about 220°C. to about 350°C. in the presence of a catalytically effective amount of a cobalt, nickel or manganese salt of an aliphatic carboxylic acid.

SUMMARY OF THE INVENTION

It has been found that an improved acid interchange polymerization process for producing an aromatic polyester comprises reacting while dissolved in a solvent which does not interfere with the acid interchange reaction substantially stoichiometric amounts of a. at least one aromatic diester of the structure

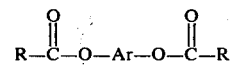

wherein R is hydrogen, an alkyl radical containing from 1 to up to about 6 carbon atoms, or a cycloalkyl radical containing up to about 8 carbon atoms, and wherein Ar is an arylene radical, and b. at least one aromatic dicarboxylic acid of the structure

wherein Ar is an arylene radical, at a temperature of about 220°C. to about 350°C. in the presence of a catalytically effective amount of a catalyst consisting of a mixture of a transition metal salt of a strong inorganic acid and a transition metal salt of an aliphatic carboxylic acid containing up to about 4 carbon atoms, said catalyst mixture comprising about 25 to 75 percent by weight of the strong inorganic acid salt, and correspondingly about 75 to 25 percent by weight of the aliphatic carboxylic acid salt.

DESCRIPTION OF PREFERRED EMBODIMENTS

The aromatic diester which may be used in the present invention has the following structure:

wherein R is hydrogen, an alkyl radical containing from 1 up to about 6 carbon atoms, or a cycloalkyl radical containing up to about 8 carbon atoms, and wherein Ar is an arylene radical. Preferably R is an alkyl radical having 1 to 4 carbon atoms. If desired, the alkyl and cycloalkyl radicals may contain inert substituents, that is, substituents which do not interfere with the formation of the diester or the acid interchange reaction between the aromatic diester and the aromatic dicarboxylic acid. Such inert substituents may include chlorine, fluorine, alkoxy groups, keto groups, aryl groups, etc.

Any substituted or unsubstituted arylene radical which does not interfere with the formation of the diester or the acid interchange reaction may be used.

Typical arylene radicals which may be employed include a. substituted or unsubstituted meta or para phenylene radicals

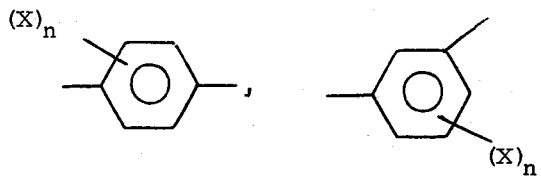

b. substituted or unsubstituted meta or para biphenylene radicals

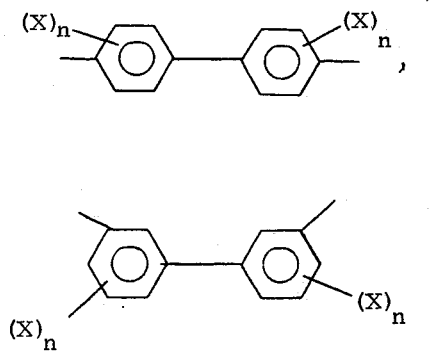

c. substituted on unsubstituted meta or para bridged biphenylene radicals

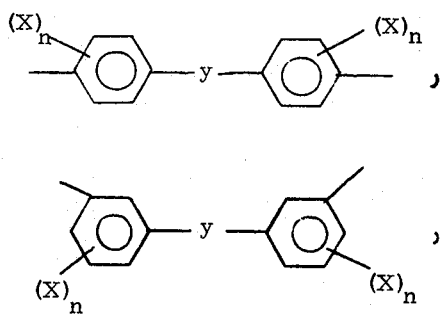

wherein y may be

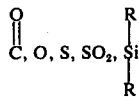

wherein R is an alkyl or aryl group, $(CH_2)_n$,

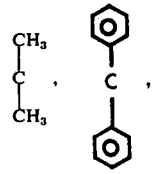

a cycloalkylidene group of up to 8 carbon atoms or any other inert bridging radical, i.e., one which does not interfere with the formation (esterification) of the aromatic diester or the acid interchange reaction between the aromatic diester and the aromatic dicarboxylic acid, and d. substituted or unsubstituted fused ring structures such as

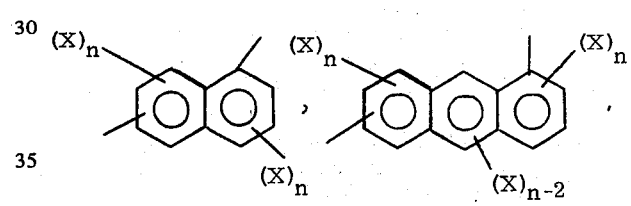

The substituent X in the above structures (a)–(d) may be any inert substituent, i.e., one which does not interfere with the diester formation or acid interchange reacton. Conventionally X is chlorine, bromine, fluorine, an alkoxy group, a keto group, an alkyl group, or an aryl group, and $n$ is 0 to 4.

The preferred aromatic diesters to be employed are

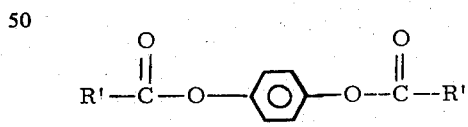

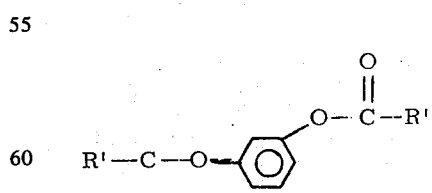

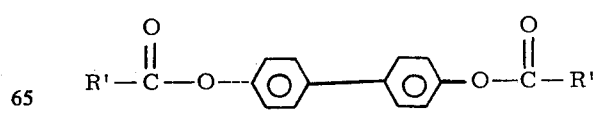

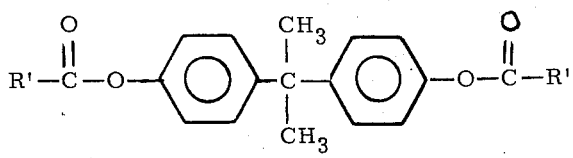

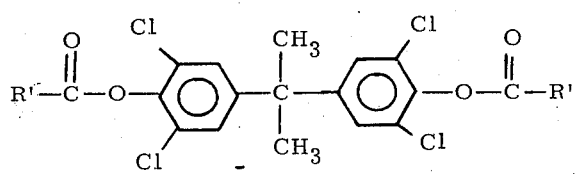

wherein R' is an alkyl radical having 1 to 4 carbon atoms and especially 1 carbon atom. Particularly preferred as the aromatic diester is the diacetate ester of Bisphenol A. Mixtures of the aromatic diesters may be used if desired.

The above described aromatic diesters may be formed by any of the well known esterification reactions. Generally bisphenols of the aromatic group, that is, the —Ar— (arylene radical) are reacted with monocarboxylic acid halides (Cl, Br or F) or acid anhydrides of the esterifying aliphatic or cycloaliphatic groups described above in the presence of an esterification catalyst and the presence or absence of a solvent. For example, acid halides or acid anhydrides of acetic acid, propionic acid, butyric acid, cyclobutanecarboxylic acid, cyclopentane carboxylic acid, cyclohexane carboxylic acid, etc. may be used. Acetic anhydride is the preferred esterifying reactant.

For example, a non-halogenated bisphenol or a bisphenol having the structural formula:

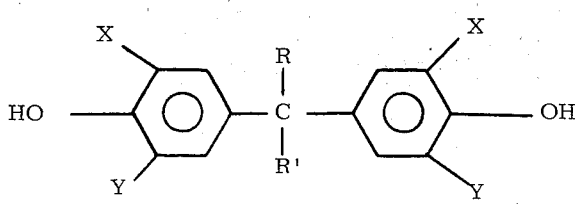

wherein X is chlorine or bromine, Y is hydrogen, chlorine or bromine and R and R' are the same or different and represent lower alkyl groups (i.e., having 1 to 6, preferably 1 to 3, carbon atoms) or hydrogen or may together constitute a cyclic hydrocarbon group; may advantageously be reacted with an aliphatic monocarboxylic acid halide or acid anhydride in the presence of the esterification catalyst and a suitable solvent.

Representative halogenated bisphenols include 4,4'-isopropylidene bis(2,6-dibromophenol); 4,4'-isopropylidene bis(2,6-dichlorophenol); 4,4'-isopropylidene bis(2-chlorophenol); 4,4'-isopropylidene bis(2-bromophenol); and 1,1'-bis(4-hydroxy-2,6-dichlorophenol)-cyclohexane. 4,4'-isopropylidene bis(2,6-dichlorophenol), commonly known as "tetrachlorobisphenol A", is the preferred bisphenol bearing halogen substituents.

The esterification reactants usually are present in amounts sufficient to fully esterify the bisphenol and thus form the diester. Generally, esterification is conducted with the bisphenol and esterifying reactants present in molar amounts of from about 1:2 to about 1:10, preferably from about 1:2 to 1:3, bisphenol to esterifying reactant, i.e., monocarboxylic acid halide or acid anhydride. A temperature of from about 10°C. to about 150°C., preferably from about 20°C. to about 100°C., is normally employed. Suitable esterification catalysts include sulfuric acid, sodium acetate, or the like and are typically present in a catalytically effective amount (which amount can be, for example, from about 0.001 to about 1, preferably from about 0.01 to about 0.1, percent by weight based on the weight of the bisphenol). The esterification reaction time is that which is sufficient to form the diester of the starting bisphenol, generally from about 0.1 to about 5 hours. If desired, the esterification reaction may be conducted in any suitable solvent for the materials to be reacted, provided the solvent does not interfere with the esterification reacton (e.g., does not react with the bisphenol or esterifying reactants). The esterification reaction solvent may be a hydrocarbon, halogenated aliphatic or aromatic hydrocarbon or the like and includes particularly solvents such as diphenyl ether, benzophenone, dichloroethane, dichlorobenzene, acetic anhydride, dichloromethane, chloroform, hexane, heptane, petroleum ether, benzene, xylene, toluene, tetrachloroethane, and the like. As previously indicated the esterification reaction itself forms no part of the present invention and may be accomplished by any mode or in any way desired so long as the desired aromatic diester is obtained.

The dicarboxylic aromatic acid to be reacted with the above described aromatic diesters has the structure

wherein Ar is an arylene radical as defined above with respect to the aromatic diesters. Thus, any unsubstituted or inert substituted dicarboxylic aromatic acid may be used, the inert substituent being one which does not interfere with the acid interchange reaction. Mixtures of the acids may also be used.

Preferably the dicarboxylic acid is isophthalic acid; terephthalic acid; naphthalene-2,6-dicarboxylic acid; 4,4'-bibenzoic acid; 4,4'-oxybibenzoic acid; 4,4'-sulfonyl bibenzoic acid, or 4,4'-benzophenone dicarboxylic acid. Especially preferred are mixtures of terephthalic and isophthalic acid, such as from about 10 to 60 percent by weight, of terephthalic acid and, correspondingly, from about 90 to 40 percent by weight, preferably from about 80 to 50, of isophthalic acid, the percent by weight being based on the total weight of the acid mixture..

The aromatic diester and aromatic dicarboxylic acid are reacted (acid interchange reaction) in the presence of a solvent which does not interfere with the acid interchange polymerization reaction. In other words the solvent must be a solvent for both the diester and the diacid. In addition, the solvent conveniently must have a boiling point above about 220°C. in order to avoid being vaporized during the early stages of the acid interchange reaction, that is, at least until the by-product of the reaction, the "exchanged acid" is removed from the reaction zone. The presence of the solvent also helps maintain the forming polymer in a more workable or handable form, by either acting as a plasticizer or solvent for the polymer. In either case, the solvent is preferably not removed until after the polymerization (transesterification) reaction is completed.

Suitable solvents preferably have a boiling point between about 200° and 350°C. and more preferably between about 220° and 300°C. and include diphenyl ether, halogenated diphenyl ether, diphenyl sulfone, benzophenone, polyphenyl ethers such as tri and tetraphenyl ether, terphenyl, tetraphenyl, halogenated biphenyl, and the like.

The diester and diacid reactants may be polymerized in any convenient manner or apparatus desired, for example, on a batch or continuous basis, preferably batch. Moreover, the reactants may be added to the acid interchange, i.e., polymerization zone, in any way or order desired such as by adding solutions of one or both reactants to a solution or non-solution of the other so long as the polymerization reaction takes place with the reactants dissolved in a solvent.

Generally, substantially stoichiometric amounts of each reactant are employed; typically molar amounts of from about 0.8:1 to about 1.2:1, preferably from about 0.9:1 to about 1.1:1, of aromatic diester to aromatic dicarboxylic acid. Of course, when mixtures of each reactant are employed the ratios apply to the total moles in the diester or diacid mixture.

The acid interchange reaction conveniently may be preformed at a temperature of from about 220°C. to about 350°C., preferably from about 240°C. to about 320°C., however, higher or lower temperatures may be used so long as degradation of the resulting polymer does not occur. Usually the pressure in the polymerization zone is substantially atmospheric or slightly higher (say up to about 20 p.s.i.g.) pressure, however higher or lower pressures may be used if so desired. When higher pressures are used, lower boiling solvents may be employed.

The acid interchange reaction is also desirably conducted in an inert atmosphere such as argon, helium, nitrogen or the like in order to minimize any oxidation or degradation of the resulting polymer.

As previously mentioned, the essence of the present invention is the conducting of the acid interchange reaction in the presence of a catalytically effective amount of a catalyst which is a mixture of a transition metal salt of a strong inorganic acid and a transition metal salt of an aliphatic carboxylic acid.

The term "transition metal" as used herein, is used in its normal sense and includes those metals of atomic numbers 21 through 29, 39 through 47, 57 through 79 and the known elements from 89 on. The preferred transition metals are those of Groups VIII (most preferably the iron-group metals, i.e., iron, cobalt and nickel) and Group VII (most preferably manganese).

Among the strong inorganic acid salts which are suitable for use in the catalyst mixture in the process of the present invention are the transition metal salts of hydrochloric, nitric, perchloric, hydrobromic, hydroidic, chloric and hydrocyanic acids. The chloride, nitrate and perchlorate salts are preferred.

The aliphatic carboxylic acid salts which are suitable for use in the catalyst mixture include transition metal salts of aliphatic carboxylic acids containing up to about four carbon atoms, for example salts of formic, acetic, propionic, butyric and isobutyric acids. Acetic acid salt is preferred.

The catalyst mixture contains from about 25 to 75, preferably from about 40 to 60, and most preferably about 50, percent by weight of the catalyst mixture of the strong inorganic acid salt and correspondingly, from about 75 to 25, preferably from about 60 to 40, most preferably 50 percent by weight of the catalyst mixture of the aliphatic carboxylic acid salt.

The transition metal salts of the strong inorganic acid and the aliphatic carboxylic acid may be combined in any suitable manner, and added to the polymerization zone either before, during or after the addition of the diacid and diester reactants. Generally, the salts are physically mixed in any convenient manner before being combined with the reactants, or added as a solution in a suitable solvent. The transition metal of the salts may be the same or different.

The catalyst mixture may be advantageously formed by mixing the transition metal salt of the aliphatic carboxylic acid with the strong inorganic acid, the latter being present in an amount sufficient to yield the desired amount of strong inorganic salt. The salt reacts with the strong inorganic acid to form the strong inorganic salt and free aliphatic carboxylic acid. This method may be illustrated by the following reaction to form an equimolar mixture of the mixed transition metal (M) acetate (Ac) - nitrate salt:

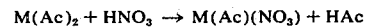

M(Ac)₂ + HNO₃ → M(Ac)(NO₃) + HAc

The catalyst mixture formed in this manner appears to be more soluble in the acid interchange reaction solvent than a corresponding physical mixture of the preformed salts.

The catalyst is employed in an amount of from about 0.0001 to about 2.0, preferably from about 0.001 to about 1.0 percent by weight, based on the total weight of the mixture of diester and diacid reactants used.

While the present process has been described above in terms of first obtaining the diester and then reacting the diester with the diacid in an acid interchange polymerization reaction, the bisphenol starting material and aliphatic esterifying reactant may be dissolved in the acid interchange reaction solvent with the aromatic diacid and the mixed salt catalyst, and the materials reacted in a single reaction zone under the conditions described above for the acid interchange reaction to form the aromatic polyester product. While a single reaction method would not require a separate vessel for the aromatic diester preparation as well as separation of the diester from the esterification reaction medium, the two-reaction method affords better control of the diester purity due to the isolation step (which also leads to some loss of the diester).

Moreover, when the esterification and acid interchange reactions are combined it is also possible to use a partial ester of the bisphenol so long as the polymerization reaction zone contains a sufficient amount of acid halide or acid anhydride esterifying reactant to convert the partial ester to the diester for reaction with the diacid.

The aromatic polyester product is usually obtained in about 2 ½ to 48 hours, more or less, depending upon the specific reaction conditions used and the molecular weight of the final polymer product desired.

Generally the acid interchange reaction is conducted so as to obtain an aromatic polyester having an inherent viscosity (I.V.) of at least about 0.4, generally at least about 0.7. The I.V. is determined by measurement of the relative viscosity of a 0.1 percent solution of the polymer at 25°C. in a suitable solvent, such as a 10/7 (w/w) mixture of phenol/trichlorophenol. The viscosity of the polymer solution is measured relative to the of the solvent alone and the inherent viscosity (I.V.) is determined from the following equation:

$$I.V. = \frac{\ln \frac{V_2}{V_1}}{C}$$

In the above formula, $V_2$ is the efflux time of the solution, $V_1$ is the efflux time of the solvent, and C is the concentration expressed in grams of polymer per 100 ml. of solution. As is known in the polymer art, inherent viscosity is monotonically related to the molecular weight of the polymer.

The aromatic polyesters prepared by the process of the present invention may be dissolved in a suitable spinning or casting solvent, such as methylene chloride or tetrahydrofuran and formed into a shaped article, such as a fiber, filament or film. They may also be used as coatings or to make molded articles.

The invention is additionally illustrated in connection with the following Examples, which are to be considered as illustrative of the present invention. It should be understood, however, that the invention is not limited to the specific details of the Examples.

Unless otherwise indicated, all percentages or proportions of materials mentioned in the specification and appended claims are by weight.

EXAMPLE I

Each of these runs is conducted utilizing a reaction mixture containing 0.1 mole of the diacetate of 4,4'-isopropylidene bis(2,6-dichlorophenol), 0.07 mole of isophthalic acid, 0.03 mole of terephthalic acid and various amounts of different catalysts as shown in Table I, dissolved in 50 ml. diphenyl ether. The reaction mixture is heated at a temperature of about 260°C. for 22 hours. Another aliquot of 50 ml. of diphenyl ether is added after 5 hours reaction time to thin the reaction mixture. The I.V. of the resulting polymer is measured at 25°C. in a solution of a mixture of 70 percent by weight phenol and 30 percent by weight of trichlorophenol.

As may be seen from the Table, the resulting polymers all had consistent, relatively hig I.V. values even when relatively small amounts of the mixed salt catalyst are utilized.

TABLE I

| Catalyst | Total Wt % Catalyst** | I.V. dl/g |
|---|---|---|
| MnAc*$_2$/Mn(NO$_3$)$_2$ | 0.2 | 0.30 |
| MnAc$_2$/MnCl$_2$ | 0.16 | 0.41 |
| CoAc$_2$/Co(NO$_3$)$_2$ | 0.1 | 0.31 |
| NiAc$_2$/NiCl$_2$ | 0.1 | 0.45 |
| NiAc$_2$/Ni(NO$_3$)$_2$ | 0.04 | 0.60 |
| NiAc$_2$/Ni(NO$_3$)$_2$ | 0.04 | 0.55 |
| NiAc$_2$/Ni(NO$_3$)$_2$ | 0.08 | 0.54 |
| NiAc$_2$/Ni(NO$_3$)$_2$ | 0.1 | 0.73 |
| NiAc$_2$/Ni(NO$_3$)$_2$ | 0.1 | 0.50 |
| NiAc$_2$/Ni(NO$_3$)$_2$ | 0.1 | 0.58 |

TABLE I-continued

| Catalyst | Total Wt % Catalyst** | I.V. dl/g |
|---|---|---|
| NiAc$_2$/Ni(NO$_3$)$_2$ | 0.2 | 0.55 |

*"Ac" is used in these Examples to indicate the acetate anion.
**Based on the combined weight of the bisphenol diacetate and aromatic acids.

EXAMPLE II

Reaction mixtures of 0.1 mole of the diacetate of 4,4'-isopropylidene bis(2,6-dichlorophenol), 0.25 g. acetic anhydride, 0.07 mole isophthalic acid, 0.03 mole terephthalic acid and various amounts of different catalyst mixtures, all of which utilize nickel as the transition metal anion, are dissolved in 50 ml. diphenyl ether and reacted at about 260°C. After 5 hours, another 50 ml. diphenyl ether is added to make the reaction mixture stirrable. The particular catalyst sytem, amount of catalyst, reaction time and the I.V. of the resulting polymer (measured as in Example I) are shown below in Table II.

TABLE II

| Catalyst System | Catalyst Weight % | Reaction Time, hrs. | I.V., dl/g |
|---|---|---|---|
| NiAc$_2$/Ni(NO$_3$)$_2$ | 0.8 | 24 | 0.53 |
| NiAc$_2$/Ni(NO$_3$)$_2$ | 0.6 | 24 | 0.73 |
| NiAc$_2$/Ni(NO$_3$)$_2$ | 0.4 | 24 | 0.62 |
| NiAc$_2$/Ni(NO$_3$)$_2$ | 0.2 | 24 | 0.43 |
| NiAc$_2$/Ni(NO$_3$)$_2$ | 0.1 | 24 | 0.45 |
| NiAc$_2$/Ni(NO$_3$)$_2$ | 0.1 | 32 | 0.78 |
| NiAc$_2$/Ni(NO$_3$)$_2$ | 0.08 | 24 | 0.48 |
| NiAc$_2$/Ni(NO$_3$)$_2$ | 0.04 | 34 | 0.68 |
| NiAc$_2$/Ni(NO$_3$)$_2$ | 0.02 | 24 | 0.82 |
| NiAc$_2$/NiCl$_2$ | 0.02 | 24 | 0.80 |
| NiAc$_2$/NiCl$_2$ | 0.1 | 24 | 0.45 |
| NiAc$_2$/Ni(ClO$_4$)$_2$ | 0.05 | 24 | 0.58 |

EXAMPLE III

A halogenated aromatic polyester is formed from the halogenated aromatic bisphenol in a one-step reaction without the necssity for the separate preparation and isolation of the diacetate of the halogenated aromatic bisphenol. In these runs, 0.1 mole 4,4'-isopropylidene bis(2,6-dichlorophenol), 0.07 mole isophthalic acid, 0.03 mole terephthalic acid and acetic anhydride in amounts of 21, 21.2 and 23 ml. (which corresponds to 0,1 and 10 percent acetic anhydride in excess of that necessary to form the diacetate of the said bisphenol) are dissolved in 50 ml. diphenyl ether along with 0.1 percent by weight of the mixture of an equimolar mixture of nickel acetate and nickel nitrate. After 30 hours reaction time, the resulting polymers are found to have an I.V. of 0.40, 0.32 and 0.85, respectively, measured as in Example I and good color.

EXAMPLE IV

The reaction mixture of Example I utilizing different catalyst mixtures is reacted in the manner of Example I. The catalyst mixtures amounts of catalyst and the I.V. of the resulting polymers are shown in Table III.

TABLE III

| Catalyst Mixture | Catalyst Amount, Weight Percent | I.V. dl/g |
|---|---|---|
| NiAc$_2$/Co(NO$_3$)$_2$ | 0.10 | 0.60 |
| MnBu$_2$*/MnCl$_2$ | 0.15 | 0.52 |

TABLE III-continued

| Catalyst Mixture | Catalyst Amount, Weight Percent | I.V. dl/g |
|---|---|---|
| ThAc$_2$/Th(NO$_3$)$_2$ | 0.10 | 0.55 |
| MnPr$_2$**/Th(NO$_3$)$_2$ | 0.15 | 0.50 |
| CoAc$_2$/Co(ClO$_4$)$_2$ | 0.10 | 0.57 |
| CuPr$_2$/Cu(NO$_3$)$_2$ | 0.15 | 0.59 |

*"Bu" is used in these Examples to indicate the butyrate anion.
**"Pr" is used in these Examples to indicate the propionate anion.

EXAMPLE V

The procedure of Example I is repeated utilizing a reaction mixture containing 0.1 mole of the diacetate of 4,4'-isopropylidene bis(2,6-dibromophenol), 0.07 mole of isophthalic acid, 0.03 mole of terephthalic acid and 0.1 percent by weight of an equimolar mixture of nickel acetate and nickel nitrate. The resulting brominated aromatic polyester had an I.V. of 0.35.

COMPARATIVE EXAMPLE

The procedure of Example I is repeated utilizing reaction mixtures which include as the catalyst various transition metal compounds, salts of acetic acid and salts of inorganic acids. The catalyst, amount used and the I.V. of the resulting polymer is shown below in Table IV.

TABLE IV

| Catalyst | Wt. % Catalyst (Based on Polymer) | I.V. dl/g |
|---|---|---|
| MnAc$_2$ | 0.01 | 0.51 |
| MnAc$_2$ | 0.02 | 0.36 |
| MnAc$_2$ | 0.2 | 0.33 |
| MnAc$_2$ | 0.4 | 0.41 |
| MnAc$_2$ | 0.5 | 0.37 |
| MnAc$_2$ | 1.0 | 0.32 |
| MnCl$_2$ | 0.01 | 0.32 |
| Mn(NO$_3$)$_2$* | 0.01 | 0.22 |
| CoAc$_2$ | 0.02 | 0.28 |
| CoAc$_2$ | 0.1 | 0.30 |
| CoAc | 0.1 | 0.28 |
| Co(NO$_3$)$_2$ | 0.1 | 0.30 |
| Sb$_2$O$_3$ | 0.02 | 0.25 |
| Sb$_2$O$_3$ | 1.0 | 0.31 |
| ZnO | 0.01 | 0.31 |
| ZnAc$_2$ | 0.01 | 0.39 |
| ZnCl$_2$ | 0.02 | 0.32 |
| NiAc$_2$ | 0.05 | 0.47 |
| NiAc$_2$ | 0.02 | 0.36 |
| NiAc$_2$ | 0.1 | 0.28 |
| NiAc$_2$ | 0.3 | 0.62 |
| NiAc$_2$ | 0.5 | 0.58 |
| NiAc$_2$ | 1.0 | 0.36 |
| NiCl$_2$ | 0.05 | 0.34 |
| NiNO$_3$ | 0.05 | 0.36 |
| AgNO$_3$ | 0.01 | 0.37 |
| AgAc | 0.01 | 0.40 |
| Hg(NO$_3$)$_2$ | 0.02 | 0.29 |
| HgAc$_2$ | 0.02 | 0.24 |

*Manganese nitrate unstable — decomposes

EXAMPLE VI 800 grams of acetic anhydride and 2 drops of concentrated sulfuric acid are placed in a vessel and 456 grams of Bisphenol A (i.e. 4,4'-isopropylidenediphenol) are added with stirring. The contents of the vessel are stirred at 100°C. for 1 hour, and are cooled to about 15°C. The Bisphenol A diacetate formed crystallizes from the solution, is removed by filtration, is washed with deionized water in a high shear mixer, and is dried in a forced air oven at 70°C. for 24 hours.

To a 500 ml. three-necked flask equipped with a stirrer, nitrogen inlet, and distillation head next are added 62.468 grams of the Bisphenol A diacetate, 23.258 grams isophthalic acid, 9.968 grams terephthalic acid, 50 ml. of diphenyl ether, 0.1 gram nickel acetate (as hexahydrate), and 0.1 gram nickel nitrate (as hexahydrate). The mixture is heated at 250°C. for 1 hour, the reactants dissolve, and acetic acid is distilled from the reaction mixture. The heating of the reaction mixture is increased to 300°C. as the acetic acid evolution diminishes and is held at that temperature for 2 hours during which time the contents of the flask become viscous. Diphenyl ether gradually is distilled from the reaction mixture over a 2 hour period and remaining solvent is removed by application of a vacuum for one-half hour. The remaininng reaction mixture is cooled and the resulting aromatic polyester recovered as a clear tan solid exhibiting an inherent viscosity of 0.65 dl./g. (measured as in Example I).

EXAMPLE VII

Example VI is repeated with the exception that 0.1 gram of manganese acetate (as hexahydrate) is substituted for the nickel acetate, and 0.1 gram manganese perchlorate (as hexahydrate) is substituted for the nickel nitrate. The resulting aromatic polyester exhibits an inherent viscosity of 0.61 dl./g. (measured as in Example I).

EXAMPLE VIII

Example VI is repeated with the exception that in place of the nickel salts is substituted 0.6 gram of a solution formed from 5 grams nickel acetate (as hexahydrate) and 5 grams nickel perchlorate (as hexahydrate) in 100 ml. of acetic anhydride. The polymerization reaction is observed to proceed at a faster rate and the resulting aromatic polyester exhibits an inherent viscosity of 0.78 dl./g. (measured as in Example I).

COMPARATIVE EXAMPLES

The procedure of Example VI is repeated with the exception that the diphenyl ether solvent is omitted. No acetic acid is evolved, and no polymer is recovered.

The procedure of Example VI is repeated with the exception that the nickel salts are omitted. The initial portion of the reaction is found to require four hours instead of one hour, and the product of the reaction exhibits an inherent viscosity of only 0.22 dl./g. (measured as in Example I).

EXAMPLE IX

The aromatic polyester of Example VI is formed in a single reaction zone without the necessity for the separate preparation and isolation of the Bisphenol A diacetate.

To the 500 ml. three-necked flask previously described is charged 45.6 grams of Bisphenol A (i.e. 4,4'-isopropylidenediphenyl), 42 grams acetic anhydride, 50 ml. diphenyl ether, 13.82 grams isophthalic acid, and 9.28 grams terephthalic acid. The mixture is heated at about 175°C. for 1 hour during which time 30 grams of acetic acid are removed by distillation. To the mixture is added 6 drops (i.e. 0.4 gram) of a solution prepared from 3 grams nickel acetate (as hexahydrate) and 3 grams nickel perchlorate (as hexahydrate) in 50 grams acetic anhydride. The mixture is polymerized as described in Example VI. Initially Bisphenol A diacetate is formed which subsequently undergoes acid interchange polymerization with the isophthalic acid and terephthalic acid. The product exhibits an inherent viscosity of 0.65 dl./g. (measured as in Example I).

EXAMPLE X 800 grams of acetic anhydride and 2 drops of concentrated sulfuric acid are placed in a vessel and 640 grams of phenolphthalein [i.e. 3,3-bis(p-hydroxyphenyl)phthalide] are added with stirring. The contents of the vessel are stirred at 100°C. for 1 hour, and are cooled to about 15°C. The phenolphthalein diacetate formed crystallizes from the solution, is removed by filtration, is washed with deionized water in a high shear mixer, is dried in a forced air oven at 70°C. for 24 hours, and is recrystallized from toluene.

The acid interchange polymerization procedure of Example VI is repeated with the exception that 80.8 grams of the phendphthalein diacetate are substituted for the Bisphenol A diacetate. The resulting aromatic polyester exhibits an inherent viscosity of 0.65 dl./g. (as measured in Example I). When melt pressed the aromatic polyester forms a clear, slightly yellowish film which is self-extinguising when ignited from the bottom.

EXAMPLE XI

This example illustrates a further embodiment of the concept of the present invention wherein the acid interchange polymerization reaction is carried out through the use of one or more aromatic reactants possessing both ester and carboxylic radicals upon the same molecule. Separate aromatic diester reactants and separate aromatic dicarboxylic acid reactants accordingly are not required. For instance, any hydroxy aromatic carboxylic acid of the general formula:

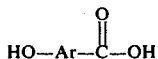

wherein Ar is as previously defined (e.g. hydroxy benzoic acids) may be esterified in the same manner utilized to form an aromatic diester as previously described with the exception that a monoester now is formed. The monester utilized in the acid interchange reaction then possesses the general formula.

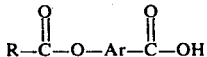

wherein R is hydrogen, an alkyl radical containing 1 to up to about 6 carbon atoms, or a cycloalkyl radical containing up to about 8 carbon atoms, and Ar is an arylene radical as previously defined. This product may then be subjected to the acid interchange polymerization reaction in the presence of the catalyst mixture as previously described.

For example, 500 grams of acetic anhydride and 2 drops of sulfuric acid are placed in a vessel and 274 grams of p-hydroxy benzoic acid are added with stirring. The contents of the vessel are stirred at 100°C. for 1 hour, and are cooled to about 15°C. The p-acetoxy benzoic acid formed is recovered by pouring the hot acetic anhydride solution over an ice/water mixture, removing the product by filtration, washing the same with deionized water in a high shear mixer, and drying in a forced air oven. A like quantity of m-acetoxy benzoic acid is formed in an identical manner utilizing m-hydroxy benzoic acid as one of the reactants.

50 grams of the p-acetoxy benzoic acid, and 50 grams of the m-acetoxy benzoic acid are charged to a 500 ml. three-necked flask equipped with a stirrer, nitrogen inlet and distillation head. To the contents of the flask are added 50 ml. of diphenyl ether, 0.1 gram nickel acetate (as hexahydrate), and 0.1 nickel nitrate (as hexahydrate). The reactants are polymerized in accordance with the same procedure described in Example VI. The resulting aromatic polyester is insoluble in the solvent utilized for inherent viscosity determinations in the other examples, and is capable of compression molding at 280°C. to give clear flexible films which are difficult to ignite and are self-extinguishing when ignited.

Although the invention has been described with preferred embodiments, it is to be understood that variation and modification may be resorted to as will be apparent to those skilled in the art. Such variations and modifications are to be considered within the purview and scope of the claims appended hereto.

I claim:

1. An acid interchange polymerization process for producing an aromatic polyester comprising reacting while dissolved in a solvent which does not interfere with the acid interchange reaction substantially stoichiometric amounts of a. at least one aromatic diester of the structure

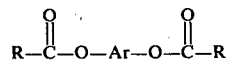

wherein R is hydrogen, an alkyl radical containing from 1 to up to about 6 carbon atoms, or a cycloalkyl radical containing up to about 8 carbon atoms, and wherein Ar is an arylene radical, and b. at least one aromatic dicarboxylic acid of the structure

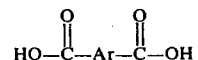

wherein Ar is an arylene radical,
at a temperature of about 220°C. to about 350°C. in the presence of a catalytically effective amount of a catalyst consisting of a mixture of a transition metal salt of a strong inorganic acid and a transition metal salt of an aliphatic carboxylic acid containing up to about 4 carbon atoms, said catalyst mixture comprising about 25 to 75 percent by weight of said strong inorganic acid salt, and correspondingly about 75 to 25 percent by weight of said aliphatic carboxylic acid salt.

2. The process of claim 1 wherein said solvent has a boiling point of about 200° to 350°C.

3. The process of claim 1 wherein said arylene radical is selected from the group consisting essentially of:

a. the substituted or unsubstituted meta or para phenylene radicals

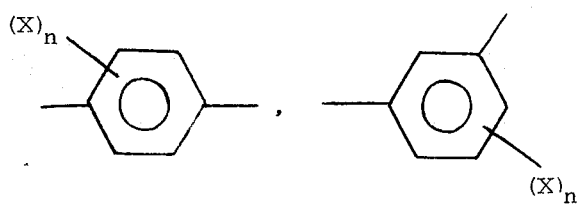

b. the substituted or unsubstituted meta or para biphenylene radicals.

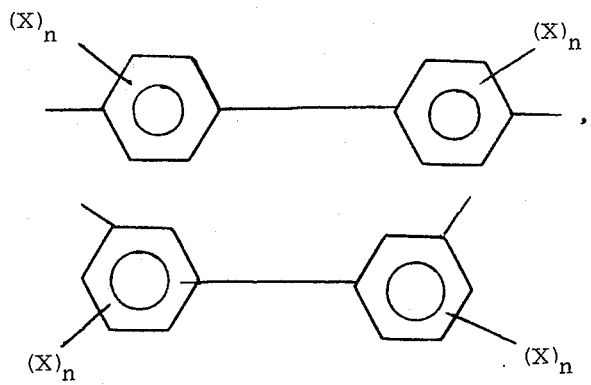

c. the substituted or unsubstituted meta or para bridged biphenylene radicals

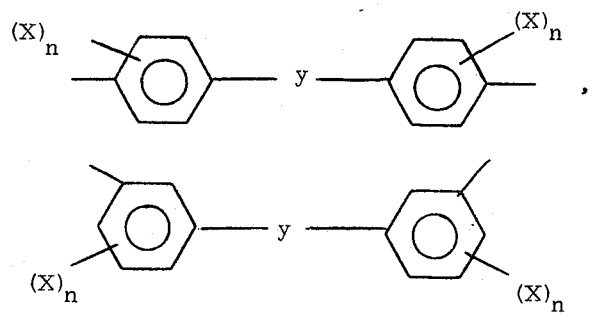

wherein y may be

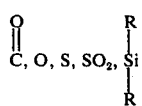

wherein R is an alkyl or aryl group, $(CH_2)_n$,

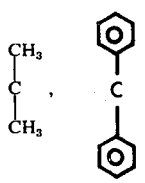

a cycloalkylidene group of up to 8 carbon atoms or other inert bridging radical, d. the substituted or unsubstituted fused ring structures

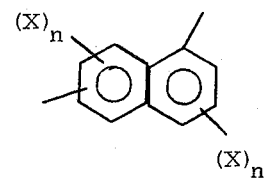

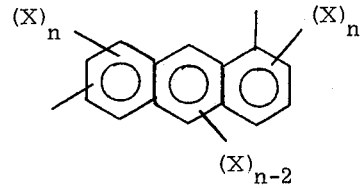

or mixtures of the foregoing, wherein X is an inert substituent which does not interfere with the acid interchange reaction, and $n$ is 0 to 4.

4. The process of claim 3 wherein $n$ is 0.

5. The process of claim 3 wherein X is chlorine, bromine, fluorine, an alkoxy group, a keto group, an alkyl group, an aryl group, or mixtures thereof.

6. The process of claim 3 wherein said aromatic dicarboxylic acid is an acid mixture which contains from about 20 to about 50 percent by weight of the mixture of terephthalic acid, and correspondingly from about 80 to about 50 percent by weight of the mixture of isophthalic acid.

7. The process of claim 6 wherein said catalyst mixture includes a salt of acetic acid.

8. The process of claim 7 wherein the solvent is diphenyl ether, the catalyst mixture comprises from about 40 to about 60 percent by weight of the mixture of said inorganic acid salt, and correspondingly from about 60 to about 40 percent by weight of said aliphatic carboxylic acid salt, and the catalyst is present in an amount from 0.0001 to about 2 percent by weight of the total weight of said aromatic diester and said aromatic dicarboxylic acid.

9. The process of claim 1 wherein said aromatic diester is an acetic acid diester, said aromatic dicarboxylic acid is an acid mixture which contains from about 20 to about 50 percent of the mixture of terephthalic acid and correspondingly from about 80 to about 50 percent of the mixture of isophthalic acid, said catalyst is a mixture of cobalt, nickel or manganese salts of acetic acid and nitric acid, said acid salts being present in an amount of about 40 to about 60 percent by weight of the mixture of said nitric acid salt, and correspondingly from about 60 to about 40 percent by weight of said acetic acid salt, the catalyst mixture being present in an amount of from 0.0001 to about 2 percent by weight of total of said aromatic diester and the aromatic dicarboxylic acid, and said solvent is diphenyl ether.

10. The process of claim 3 wherein the ester and carboxylic acid functional groups of the reactants required for the acid interchange polymerization process are provided upon the same molecule of the general formula:

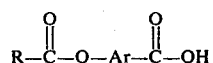

wherein R is hydrogen, an alkyl radical containing 1 to up to about 6 carbon atoms, or aa cycloalkyl radical containing up to about 8 carbon atoms, and Ar is an arylene radical as previously defined.

11. The process of claim 10 wherein said reactants required for the acid interchange polymerization reaction are a mixture of m-acetoxy benzoic acid and p-acetoxy benzoic acid.

12. An acid interchange process for producing a halogenated aromatic polyester which comprises reacting, while dissolved in a solvent which does not interfere with the acid interchange reaction substantially stoichiometric amounts of a. an aliphatic carboxylic acid ester of a bisphenol wherein said aliphatic ester group contains from 1 up to about 6 carbon atoms, said bisphenol having the recurring structural formula:

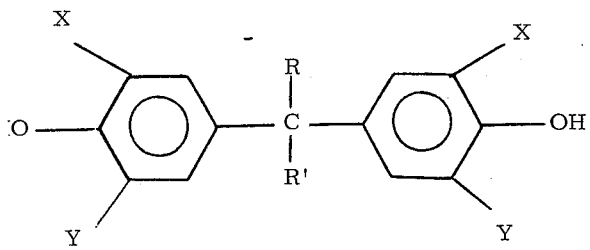

wherein X is chlorine or bromine and Y is hydrogen chlorine or bromine, R and R' may be the same or different and represent lower alkyl groups or may, together, constitute a cyclic hydrocarbon group with b. an aromatic acid mixture of terephthalic and isophthalic acids wherein from about 10 to about 60 percent by weight of the mixture is terephthalic acid, and correspondingly, from about 90 to about 40 percent by weight of the mixture is isophthalic acid, at a temperature of from about 220°C. to about 350°C. in the presence of a catalytically effective amount of a catalyst consisting of a mixture of transition metal salts of a strong inorganic acid and an aliphatic carboxylic acid containing up to about 4 carbon atoms, said mixture comprising from about 25 to about 75 percent by weight of the mixture of the said inorganic acid salt, and correspondingly, from about 75 to about 25 percent by weight of the said aliphatic carboxylic acid salt, to yield the desired halogenated aromatic polyester.

13. The process of claim 12 wherein said solvent has a boiling point of about 200° to 350°C.

14. The process of claim 12 wherein X and Y are chlorine.

15. The process of claim 14 wherein the aliphatic carboxylic acid ester is an acetic acid diester of the bisphenol.

16. The process of claim 15 wherein the said aromatic acid mixture contains from about 20 to about 50 percent of the mixture of terephthalic acid, and correspondingly, from about 80 to about 50 percent of the mixture of isophthalic acid, and wherein said aliphatic carboxylic acid salt of said catalyst mixture is a salt of acetic acid.

17. The process of claim 16 wherein the solvent is diphenyl ether, the catalyst mixture comprises from about 40 to about 60 percent by weight of the mixture of the said inorganic acid salt, and correspondingly from about 60 to about 40 percent by weight of the said aliphatic carboxylic acid salt, and the said catalyst is present in an amount of from 0.0001 to about 2 percent by weight of the total of the bisphenol diester and the aromatic acid mixture reactants.

18. The process of claim 12 wherein X and Y are bromide, the aliphatic carboxylic acid ester is an acetic acid diester of the bisphenol, the said aromatic acid mixture contains from about 20 to about 50 percent of the mixture of terephthalic acid, and correspondingly, from about 80 to about 50 percent of the mixture of isophthalic acid, said catalyst is a mixure of cobalt, nickel or manganese salts of acetic acid and nitric acid, said acid salts being present in an amount of about 40 to about 60 percent by weight of the mixture of the said nitric acid salt, and correspondingly from about 60 to about 40 percent by weight of the said acetic acid alt, the catalyst mixture being present in an amount of from 0.0001 to about 2 percent by weight of the total of the bisphenol diester and the aromatic acid mixture reactants, and the solvent is diphenyl ether.

19. An acid interchange process for forming a halogenated aromatic polyester which comprises reacting while dissolved in a solvent having a boiling point above about 200° to 350°C. which does not interfere with the acid interchange reaction, a lower aliphatic carboxylic acid containing from 1 up to about 6 carbon atoms, a bisphenol having the recurring structural formula:

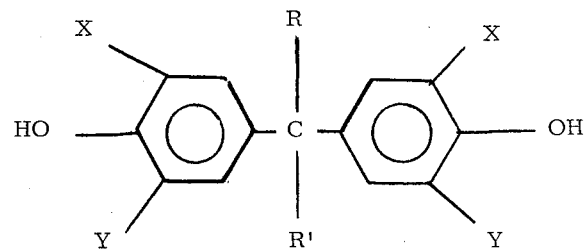

wherein X is chlorine or bromine and Y is hydrogen, chlorine or bromine, R and R' are lower alkyl groups and an aromatic acid mixture of terephthalic and isophthalic acids wherein from about 10 to about 60 percent of the mixture is terephthalic acid, and correspondingly, from about 90 to about 40 percent of the mixture is isophthalic acid, said bisphenol and aromatic acid mixture being present in substantially stoichiometric amounts, and said reaction being conducted at a temperature of from about 240°C. to about 320°C. in the presence of a catalytically effective amount of a catalyst mixture of cobalt, nickel or manganese salts of (1) an aliphatic carboxylic acid containing up to about 4 carbon atoms, and (2) a strong mineral acid to yield the desired halogenated aromatic polyester, said mixture comprising from about 25 to about 75 percent by weight of the mixture of the said inorganic acid salt, and correspondingly, from about 75 to about 25 percent by weight of the said aliphatic carboxylic acid salt.

20. The process of claim 19 wherein X and Y are chlorine, R and R' are methyl and the lower aliphatic carboxylic acid is acetic acid.

21. The process of claim 20 wherein the catalyst is a mixture of from about 40 to about 60 percent by weight of the mixture of the said inorganic acid salt, and correspondingly, from about 60 to about 40 percent by weight of the said aliphatic carboxylic acid salt, the catalyst being present in an amount of from 0.0001 to about 2 percent by weight of the total of the bisphenol diester and the aromatic acid mixture reactants.

22. The process of claim 20 wherein the solvent is diphenyl ether, the said aromatic acid mixture contains from about 20 to about 50 percent of the mixture of terephthalic acid, and correspondingly, from about 80 to about 50 percent of the mixture of isophthalic acid and the catalyst is a mixture of about 50 percent of the said inorganic acid salt and about 50 percent of the said aliphatic carboxylic acid salt.

* * * * *